H. RIGBY.
LUBRICATING MEANS FOR LEAF SPRINGS.
APPLICATION FILED DEC. 16, 1919.
1,352,314. Patented Sept. 7, 1920.
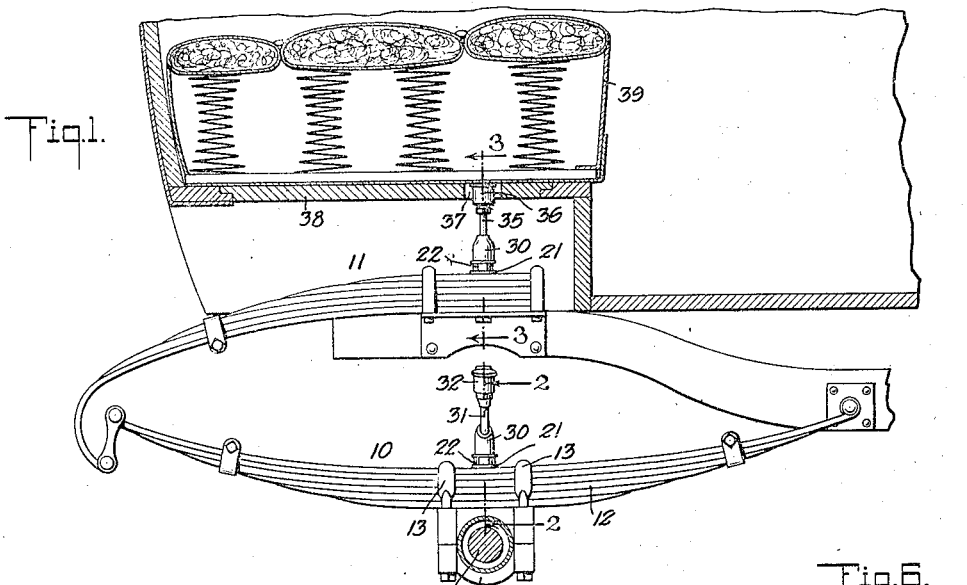
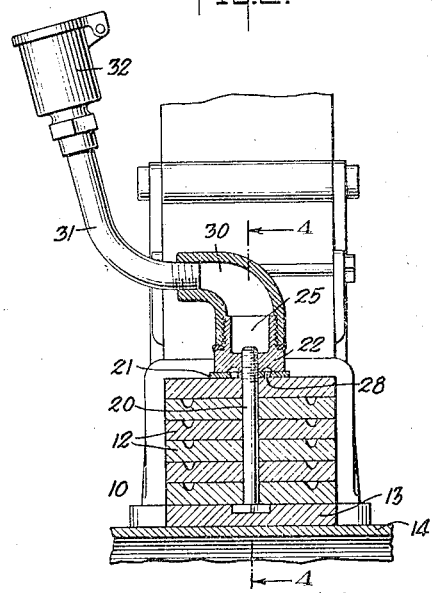
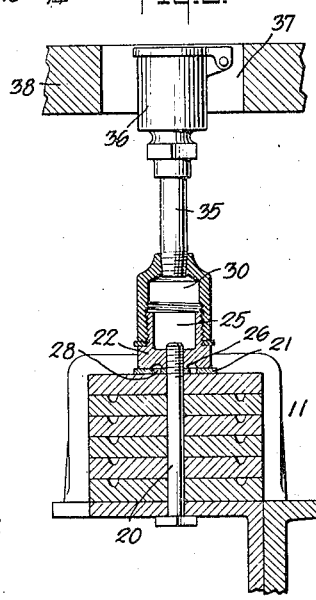
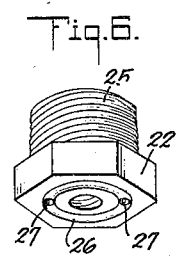
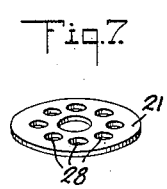
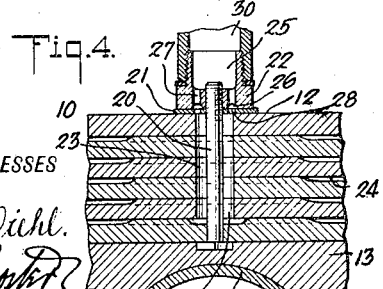
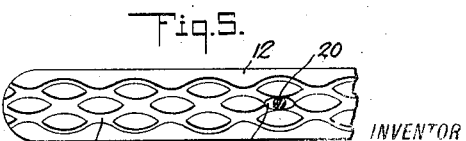
INVENTOR
Holden Rigby
BY
ATTORNEYS

UNITED STATES PATENT OFFICE.

HOLDEN RIGBY, OF PATERSON, NEW JERSEY.

LUBRICATING MEANS FOR LEAF-SPRINGS.

1,352,314. Specification of Letters Patent. Patented Sept. 7, 1920.

Application filed December 16, 1919. Serial No. 345,434.

*To all whom it may concern:*

Be it known that I, HOLDEN RIGBY, a citizen of the United States, and a resident of Paterson, in the county of Passaic and State of New Jersey, have invented a new and Improved Lubricating Means for Leaf-Springs, of which the following is a full, clear, and exact description.

The invention relates to leaf springs such as shown and described in the Letters Patent of the United States, No. 1,288,993 and No. 1,288,994, granted to me on December 24, 1918.

The object of the present invention is to provide a new and improved lubricating means for leaf springs of automobiles and other vehicles and devices, arranged to permit the use of standard parts thereby reducing the cost of manufacture to a minimum and to permit convenient replacement of the parts, if necessary.

With these and other objects in view, the invention consists of certain novel features of construction, as hereinafter shown and described and then specifically pointed out in the claim.

A practical embodiment of the invention is represented in the accompanying drawings forming a part of this specification, in which similar characters of reference indicate corresponding parts in all the views.

Figure 1 is a side elevation of the improved lubricating means as applied to the rear leaf springs of an automobile, the automobile body and the rear axle and its casing being shown in section;

Fig. 2 is an enlarged cross section of the same on the line 2—2 of Fig. 1;

Fig. 3 is a similar view of the same on the line 3—3 of Fig. 1;

Fig. 4 is an enlarged sectional side elevation of the same on the line 4—4 of Fig. 2;

Fig. 5 is a plan view of one of the leaves of a spring with the standard bolt shown in section;

Fig. 6 is an enlarged perspective view of the nut for the standard bolt; and

Fig. 7 is a similar view of the washer interposed between the top leaf and the nut of the standard bolt.

Two lubricating devices are shown applied to connect semi-elliptic and quarter-elliptic leaf springs 10 and 11 of an automobile, but I do not limit myself to these types of leaf springs as the improved lubricating means presently described in detail are applicable to other forms of springs. The lubricating device for the leaf spring 10, as shown in Figs. 1, 2 and 4, is arranged as follows: The superimposed leaves 12 of the spring 10 are fastened by clips 13 to the casing 14 of the axle 15, and the leaves are connected with each other by a standard bolt 20 having a washer 21 and a nut 22, and which washer 21 rests on the top of the uppermost leaf 12 and the nut 22 screws on the upper end of the standard bolt 20 against the washer 21. The bolt 20 passes through elongated apertures 23 formed in the superimposed leaves 12 thus providing an oil well which extends on opposite sides of the bolt 20 and delivers oil to the channels or grooves 24 formed in the leaves 12, as shown in Fig. 5 and more fully set forth in the patents above referred to so that further description of the same is not deemed necessary.

The construction so far described also applies to the leaf spring 11. The nut 22 is provided on the top with an oil receiving chamber 25 and on the bottom with an annular groove 26 connected by one or more apertures 27 with the oil receiving chamber 25 to allow the oil to flow from the oil receiving chamber 25 through the aperture 27 into the annular groove 26 from which the oil can pass through apertures 28 formed in the washer 21, it being understood that the apertures 28 of the washer are in register with the groove 26 and sundry of the said apertures 28 are in register with the aperture 23 in the spring uppermost leaf 12 to supply the oil well formed in the superimposed leaves with oil. The oil receiving chamber 25 is provided with an external thread on which screws a standard fitting 30 which for the lubricating device for the leaf spring 10 is in the form of an elbow, while for the lubricating device for the leaf spring 11 is in the form of a nipple, as will be readily understood by reference to Figs. 2 and 3. On the elbow fitting 30 screws a pipe 31 which extends outwardly and upwardly and terminates in an oil cup 32 of any approved construction. The nipple fitting 30 is provided on the top with a pipe 35 terminating in an oil cup 36 which extends into an opening 37 formed in the bottom 38 of the removable back seat 39 of the automobile to permit of conveniently filling the oil cup 36 with the oil whenever the seat 39 is removed for the time being. It will be noticed that the oil from the oil cups 32 and 36 readily flows by the pipes 31 and 35 into the fittings 30, from which the oil passes into the oil receiving chambers 25, to pass from the latter to the leaf springs 10 and 11 to effectively lubricate the said leaf springs.

It will be noticed that by the arrangement described only the washer 20 and the nut 22 are of special construction while the bolt 20, the fittings 30, pipes 31 and 35 and oil cups 32, 36 are of any approved construction and hence the expense in manufacturing the lubricating devices is reduced to a minimum.

Having thus described my invention, I claim as new and desire to secure by Letters Patent:—

A lubricating means for leaf springs, comprising a bolt extending through the spring leaves, a nut screwing on the said bolt and having an oil receiving chamber provided in the bottom with apertures for delivering the oil to the leaves, a cap screwing on the said nut, and an oil cup connected with the said cap.

HOLDEN RIGBY.